United States Patent

[11] 3,622,710

[72] Inventor Gordon R. Tothill
Chatham, Ontario, Canada
[21] Appl. No. 785,640
[22] Filed Dec. 20, 1968
[45] Patented Nov. 23, 1971
[73] Assignee Electro Dynamics & Telecon Limited
Chatham, Ontario, Canada

[54] INTERCOM CONVERTER FOR USE WITH OFFICE TONE-CONTROLLED TELEPHONE SYSTEM
1 Claim, 5 Drawing Figs.

[52] U.S. Cl. .......... 179/84 UF, 179/18 GF, 179/16 EC
[51] Int. Cl. .......... H04m 1/50
[50] Field of Search .......... 179/1.4, 18.7 Y, 18.7 YA, 37, 84 SS, 84 UF, 87, 16.45; 340/166; 317/127

[56] References Cited

UNITED STATES PATENTS

| | | | |
|---|---|---|---|
| 2,624,787 | 1/1953 | Urteaga .......... | 317/127 |
| 3,166,639 | 1/1965 | Balb .......... | 323/8 |
| 3,259,697 | 7/1966 | Brumfield et al. .......... | 179/16 |
| 3,491,209 | 1/1970 | Relsted .......... | 179/18 |

OTHER REFERENCES

"Light-activated switch expands uses of silicon-controlled rectifiers," Electronics, Vol. 37, No. 15, Howell, E. Kieth (May 4, 1964)

*Primary Examiner*—Kathleen H. Claffy
*Assistant Examiner*—Jan S. Black
*Attorney*—Wolfe, Hubbard, Leydig, Voit & Osann

ABSTRACT: A converter for converting a system of office tone-controlled telephones to enable the use of tone pushbuttons in the placing of inside calls. A series of tone detectors are provided, two of which are responsive to the two frequency components of a tone for lighting lamps in a matrix which act upon photoresistors in coded combinations in the matrix oupout lines, the output lines being coupled to the ringers in the respective telephones in the system. Means are provided for lighting indicator lamps in each of the telephones when an inside call is placed so that the other users of the system will be alerted not to place any inside call until the current call has been completed.

INVENTOR
Gordon R. Tothill

By Wolfe, Hubbard, Voit & Osann

ATTORNEYS

INVENTOR:
Gordon R. Tothill,

By: Wolfe, Hubbard, Voit & Osann.

ATTORNEYS

INTERCOM CONVERTER FOR USE WITH OFFICE TONE-CONTROLLED TELEPHONE SYSTEM

It is an object of the present invention to provide an intercom converter for an office system of tone-controlled telephones which is reliable and efficient, permitting rapid and convenient contact between calling and called telephones in the system but which is nevertheless of novel simplicity, highly compact and inherently inexpensive, so as to permit wide and universal usage in existing office systems. It is a related object of the invention to provide an intercom converter which is capable of operating reliably in the face of wide variation in input signal levels and widely varying supply voltage. It is another and related object to provide an intercom converter arrangement which is well suited for use with solid-state components having high inherent reliability and long life so that maintenance of the converter, once installed, is practically nil, which is to be contrasted with conventional converters in various versions which employ electromagnetic relays.

It is a further object to provide an intercom converter having greatly reduced response to switching transients and voice transients which tend to produce spurious operation of conventional converters. In this connection it is a general object to provide a converter which is not affected by spurious signals and which, in turn, is so isolated from the telephone lines that its addition does not affect efficient usage of the telephones in the system for normal outside communication. It is a more detailed object of the present invention to provide a converter which employs a switching matrix having incandescent lamps in the input lines and a coded arrangement of photoresistors responsive to such lamps in the output lines to insure total isolation and to achieve a brief, optimum delay in the switching impulses for immunity against response to transient impulses.

Other objects and advantages of the invention will become apparent upon reading the attached detailed description and upon reference to the drawings in which:

FIG. 1 is a schematic diagram of an intercom converter constructed and arranged in accordance with the present invention;

FIG. 2 which is partly diagrammatic, shows a typical telephone instrument used in the system of FIG. 1;

While the invention has been described in connection with the preferred embodiment, it will be understood that I do not intend to be limited to the particular embodiment shown but intend, on the contrary, to cover the various alternatives, modifications and equivalents as may be included within the spirit and scope of the invention.

Figure 1:
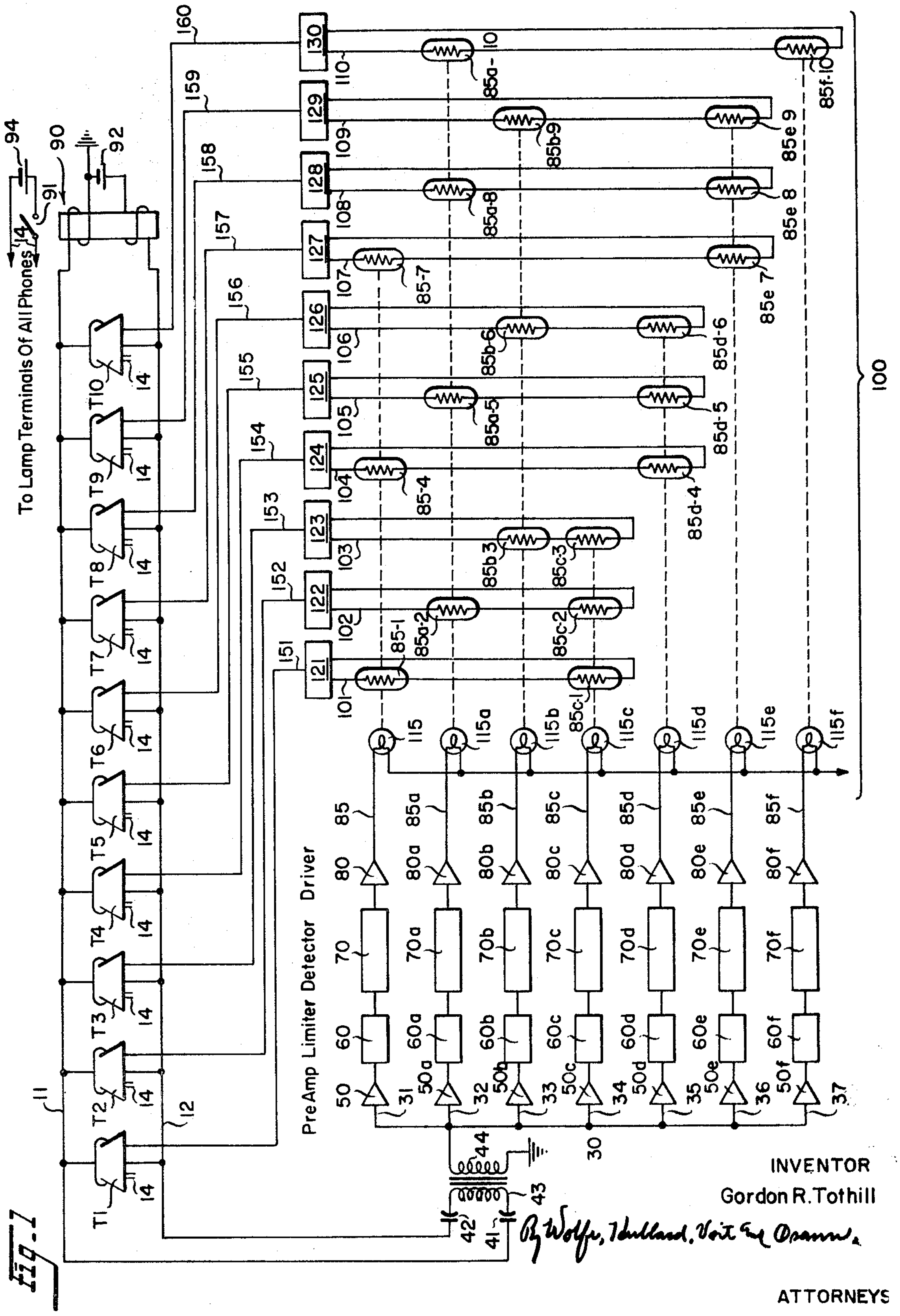
Figure 2:
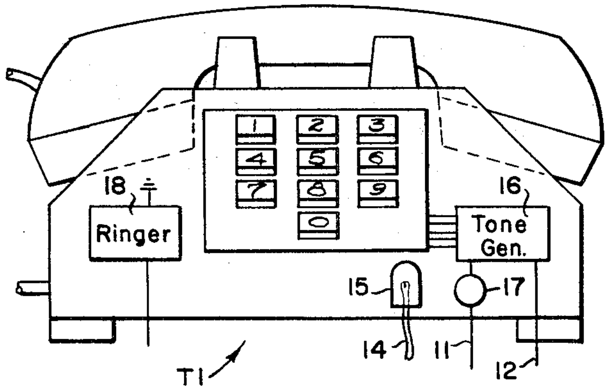

Turning now to the drawing, the tone-controlled telephones, comprising a typical office system, and 10 in total number, are indicated T1–T10. For the sake of simplicity, and since it is well understood by those skilled in the art, the regular telephones wiring has been eliminated from FIG. 1 with the exception of a tip line 11, a ring line 12 and lamp lines 14. As shown in FIG. 2, the lamp lines are connected to an indicator lamp 15, while both the tip and ring lines are connected to a tone generator 16. An intercom switch 17 may be interposed in series with the line 11. The tone generator is controlled by a set of tone buttons which have been numbered 1 to 0 inclusive. The telephones may, for example, be the type 1,500 having self-contained oscillators so that when one of the tone buttons is pressed a pair of frequencies is applied to the tip and ring lines, in accordance with the following table:

| | Tone Button | | | | | | | | | |
|---|---|---|---|---|---|---|---|---|---|---|
| Frequency | 1 | 2 | 3 | 4 | 5 | 6 | 7 | 8 | 9 | 0 |
| 1,209 | X | | | X | | | X | | | |
| 1,336 | | X | | | X | | | X | | X |
| 1,477 | | | X | | | X | | | X | |
| 697 | X | X | X | | | | | | | |
| 770 | | | | X | X | X | | | | |
| 852 | | | | | | | X | X | X | |
| 941 | | | | | | | | | | X |

For the purpose of calling the user to answer an incoming call, the telephone includes a ringer 18.

In accordance with the present invention, a plurality of frequency detectors are provided each having a filter responsive to a single frequency on the tip and ring lines, with an amplifier interposed ahead of the detector and with a driver for producing a predetermined level of signal following each detector. Further in accordance with the invention, a matrix is provided having input lines including lamps connected to the respective drivers and having a plurality of output lines each connected in series with a pair of photocells which are distributed with respect to the lamps in such a way that a selected one of the matrix output lines is energized upon pressing a corresponding tone button at a calling telephone. Each of the matrix output lines is coupled to a ringer line to produce ringing at the called telephone. Finally, the act of making an intercom call at any one of the telephones in the system is effective to light an indicator lamp at all of the telephones in the system so that the users of the other telephones are alerted to the fact that the line is busy as far as intercom calls are concerned.

Thus when the receiver is raised, switch 17 operated and one of the tone buttons depressed, a tone signal is transmitted from the lines 11, 12 to a detector input bus 30, the frequency components depending upon which of the 10 buttons has been selected. Leading from the detector bus 30 are channel input lines 31–37 corresponding to the seven control frequencies. For the purpose of isolating the detector input bus 30 from the tip and ring lines, capacitors 41, 42 are interposed in series with the lines feeding a transformer having a primary winding 43 and a secondary winding 44.

Figure 3:
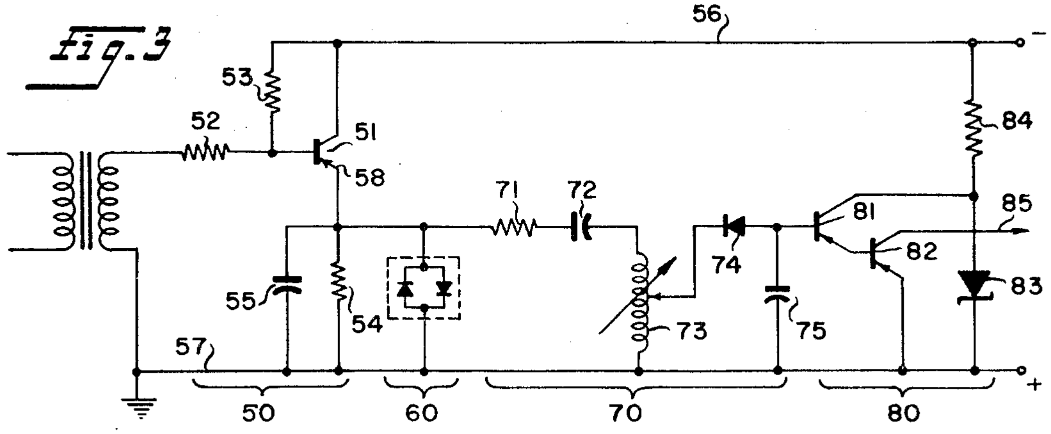
FIG. 3 is a schematic diagram of the preamplifier, limiter; detector and driver employed in each of the frequency channels of FIG. 1.

The preamplifier, limiter, detector and driver circuitry in each of the channels 31–37 is shown in FIG. 3, channel 31 being taken as representative. Here the preamplifier portion 50 of the circuit includes a transistor 51 having a series input resistor 52, collector-base resistor 53 and an emitter resistor 54 shunted by a capacitor 55. The collector is connected to a negative bus 56 which works against a ground bus indicated at 57. The gain of the transistor stage is high enough to bring all normally encountered levels of input signal to a reliably high level for operating the frequency responsive circuitry. In order to clamp the output of the preamplifier 50, the emitter, or output, terminal 58 is shunted to ground via a limiter 60. Such limiter may be any device for insuring that the signal does not exceed a certain reliable voltage level.

From the limiter the signal is passed to a detector circuit 70 having an input resistor 71, a coupling capacitor 72 and an adjustable inductance 73, the voltage developed in the inductance under resonant conditions being rectified by a diode 74 having a filter capacitor 75. Thus when one of the two frequency components in the tone corresponds to that for which the LC circuit 72, 73 has been adjusted, a relatively high signal voltage is developed which is rectified by the diode, appearing as a direct voltage across the filter capacitor 75.

In order to convert the signal voltage to current flow for energizing one of the lamps in the matrix circuit to be described, a driver 80 is used having a pair of cascade-connected transistors 81, 82. The transistor 81 is furnished with current at a regulated voltage by a zener regulator 83 having a series dropping resistor 84.

Since the voltage built up on the filter capacitor 75 is negative, because of the facing of the diode 74, the transistor 81, of the PNP type, is caused to conduct, the emitter current thereof flowing through the emitter-base circuit of the transistor 82. The resulting collector current in the transistor 82 flows through the output line 85 at a level sufficient to light a small incandescent lamp placed in series with the output line.

Since the circuitry in the remaining channels corresponds to that described immediately above, the only difference being one of frequency, corresponding parts have been indicated in the drawing by corresponding reference numerals with the addition of subscripts *a–f*. respectively.

Figure 4:
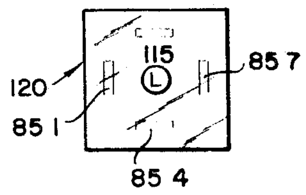
FIG. 4 shows a lamp, lamp housing and photocells used in the switching matrix.

In carrying out the present invention a matrix is provided having input lines including incandescent lamps connected to the respective driver output lines and having a plurality of output lines each connected in series with a pair of photoresistors, the incandescent lamps having individual lamp housings with the photoresistors occupying the lamp housings in accordance with a coded distribution. Thus, turning again to FIG. 1 of the drawings, a matrix 100 is provided having input lines **85–85*f*, being seven in number, and output lines 101–110 corresponding to each of the telephone units T1 to T10. Connected in series with the respective input lines are incandescent lamps 115–115*f*, each of which has from one to four associated photoresistors and with each of the photoresistors having a designation which corresponds to its grid position on the matrix. Thus lamp 115 has photoresistors 85–1, 85–4 and 85–7 coupled to it. For the purpose of isolating each lamp with its associated photoresistors, the lamp is mounted in a small light tight housing such as that indicated at 120 in FIG. 4. Preferably the lamps are operated at a voltage which is less than rated voltage to achieve extremely long life. This inherently provides thermal inertia so the unit is made less responsive to transient impulses. Moreover, the photoresistors are closely clustered around the associated lamp to provide reliable response even though the lamp voltage is low. If desired, the housing 120** may be in the form of a small block of transparent plastic in which a lamp and its photoresistors are embedded, each block being coated on all sides by a suitable opaque paint so that the photoresistors associated with the other lamps remain unaffected.

The photoresistors employed in the present invention are noncritical and are preferably of the type having a resistance which is high under dark conditions and a resistance which is relatively low when the device is illuminated. In the present embodiment, the two photoresistors associated with different lamps are connected in series; consequently, for an output line to be energized, it is necessary for two particular lamps to be lighted corresponding to a particular pair of input frequencies.

Figure 5:
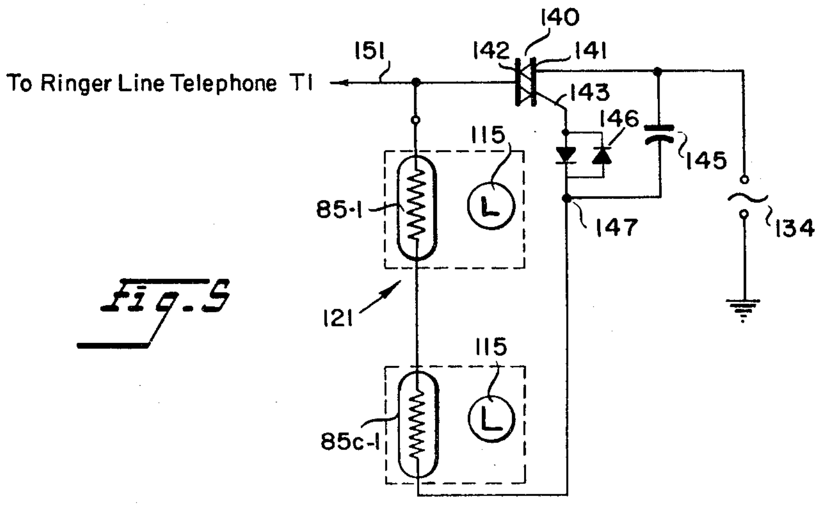
FIG. 5 shows the circuit of a solid-state ringer relay actuated by each of the matrix output lines for producing ringing in the called telephone.

For example, in order to energize the output line 101 it is necessary for lamps 115, **115*c* to be turned on. The coded distribution of the photoresistors with respect to the lamps corresponds to the coding in the frequency table which has been set forth above. For the purpose of coupling each pair of photoresistors in a particular output line to the corresponding telephone in the system, solid-state relays 121–130 are employed as shown in FIG. 5. The relay circuit utilizes a full wave gate-controlled silicon switch 140 having first and second terminals 141, 142 and a gate terminal 143. The photoresistors 85–1 and 85*c*–1 associated with the lamps 115 and 115*c* are connected to control the gate 143. Current is supplied from an external AC source 134. A capacitor 145 performs a voltage dividing function. Thus when the two photoresistors are dark and exhibit a high resistance, the impedance of the capacitor 145 will be relatively low causing the voltages which exist at the first terminal 141 and gate 143 to be substantially equal so that no current flow takes place. In order to insure that no conduction occurs in the dark condition, a blocking diode 146** is interposed in the circuit. Such blocking diode consists of two oppositely poled diodes having a predetermined forward voltage drop arranged side by side.

When both of the photoresistors 85–1 and **85*c*–1 are illuminated, the junction point 147 of the circuit shifts to provide a net voltage at the gate 143 causing the silicon switch 140 to become conductive, thereby applying current to an output line 151 which leads to the ringer of the first telephone in the series. In addition to its voltage-dividing function, the capacitor 145 performs the additional function of protecting the silicon switch against transient impulses which tend to be set up in the usual type of telephone ringer. The silicon switch 140 is preferably of the type sold under the trade name "Triac" and designated by RCA as Type 40529. The same relay circuit is employed in each of the other matrix output lines for the purpose of controlling the ringer lines 152–160 (FIG. 1**) leading to the other telephones in the series.

While the invention has been discussed in connection with a relatively simple system having a total of ten telephones, it will be apparent to one skilled in the art that the invention is not limited to intercommunication between 10 telephones and, if desired, means may be provided at the output of the matrix for responding to two signals in succession, resulting from the pushing of two pushbuttons at the telephone in succession. Thus, rather than a particular telephone ringing upon receipt of a first signal, the first signal would be stored and a total of two signals in predetermined combination would be required to produce ringing. In this way the present invention may be expanded to take care of a considerably greater number of telephones, for example, 20 or more.

It is one of the features of the present invention that means are provided for lighting indicator lamps in all of the telephones in the system when the intercom switch 17 in any one of the telephones is closed. This is accomplished by connecting a relay 90 having contacts 91, and a current source in the form of a battery 92 across the tip and ring lines 11, 12. A current source 94 in the form of a battery or the like is connected to the contacts 91, as a source of lamp current. The leads 14 of the indicator lamps 15 are all preferably connected in parallel so that when the contacts 91 close all of the lamps in the telephones are lighted indicating to the other users of the system that the intercommunication circuit is busy.

It is desirable to use incandescent lamps in the matrix since such lamps, when operated at less than rated voltage, have an extremely lone life and since the lamp filaments, particularly when operated below rated voltage, provide sufficient thermal inertia so as to avoid response to transients resulting from switching or resulting from voice frequencies.

While the invention has been discussed in connection with an "office" telephone system, it will be apparent that this term is intended to be generic to any small telephone system. Moreover, it will be apparent to one skilled in the art that the invention in certain of its aspects is not limited to use with telephones but has general utility as a signalling system.

I claim as my invention:

1. In an intercom converter for use with an office system of tone-controlled telephones, having an intercom switch for closing the circuit to tip and ring lines together with means including tone buttons for applying to the lines a tone having a pair of frequency components as well as a ringer and an indicator lamp, the combination comprising a plurality of frequency detectors each having a filter responsive to a single frequency, means for coupling the detectors to the tip and ring lines so that each detector is subjected to an input signal, each of said frequency detectors having a driver and an output line with means for producing a predetermined level of signal on the output line when the particular frequency is received, a matrix having input lines including matrix lamps connected to the respective driver output lines and having a plurality of output lines each connected in series with a plurality of photoresistors, the photoresistors in the matrix output lines being distributed for actuation by the lamps in such a way that a selected one of the output lines is energized upon pressing a corresponding tone button at the calling telephone, the matrix output lines having respective output relays coupled to the ringers of respective telephones in the system, means including a relay connected to the tip and ring lines for energizing the indicator lamps in all of the telephones to signal that the intercom circuit is busy, each matrix lamp being of the incandescent type operated at less than rated voltage to provide inherent thermal inertia and freedom from response to extraneous transient impulses on the driver output lines as well as reduced light output, the photoresistors associated with a given matrix lamp being clustered closely about the lamp for positive actuation thereof notwithstanding the reduced lamp voltage.

* * * * *